United States Patent
Hashimoto et al.

(10) Patent No.: US 10,012,974 B2
(45) Date of Patent: Jul. 3, 2018

(54) MOTOR CONTROL SYSTEM AND MOTOR CONTROL METHOD WHICH PROTECT TOOL AND WORKPIECE AT TIME OF POWER OUTAGE

(71) Applicant: FANUC Corporation, Yamanashi (JP)

(72) Inventors: Shoutarou Hashimoto, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 283 days.

(21) Appl. No.: 14/734,558

(22) Filed: Jun. 9, 2015

(65) Prior Publication Data

US 2015/0355627 A1    Dec. 10, 2015

(30) Foreign Application Priority Data

Jun. 10, 2014  (JP) .................................. 2014-119915

(51) Int. Cl.
*G05B 19/402*   (2006.01)
*G05B 15/02*    (2006.01)
*G05B 19/4063*  (2006.01)

(52) U.S. Cl.
CPC .......... *G05B 19/402* (2013.01); *G05B 15/02* (2013.01); *G05B 19/4063* (2013.01);
(Continued)

(58) Field of Classification Search
CPC ................ G05B 19/402; G05B 19/406; G05B 19/4063; G05B 19/4067; G05B 15/02;
(Continued)

(56) References Cited

U.S. PATENT DOCUMENTS 4,478,629 A * 10/1984 Wood ........................ C03B 9/41
                                                    65/158
5,307,549 A *  5/1994 Tsutsumi ............. G05B 19/186
                                                    29/27 C
(Continued)

FOREIGN PATENT DOCUMENTS

CN      101349910 A    1/2009
CN      101393448 A    3/2009
(Continued)

OTHER PUBLICATIONS

English translation of the abstract of CN 2015015340 U (published Jun. 23, 2010), Applicant—Xiangyuan Shuyuan Electrical Appliance Co. LTD, Inventor—Shuyuan Zhao.*

*Primary Examiner* — M. N. Von Buhr
(74) *Attorney, Agent, or Firm* — Hauptman Ham, LLP

(57) ABSTRACT

A motor control system which makes a tool motor and a workpiece motor rotate in synchronization in a machine tool equipped with a tool motor, a workpiece motor, and a tool shaft movement motor which drives a linear shaft to change an intershaft distance between the tool shaft and the workpiece shaft, wherein when the power outage detector detects a power outage of the power supply during synchronous rotation of the tool motor and the workpiece motor, the operation of the forced deceleration circuit for causing forced deceleration of either one of the tool motor and workpiece motor is made to be delayed by a predetermined time and during that time the tool shaft movement motor is used to drive the linear shaft and separate the tool and workpiece as a retraction operation to thereby prevent damage to the tool and the workpiece at the time of a power outage.

10 Claims, 4 Drawing Sheets

(52) U.S. Cl.
CPC .............. *G05B 2219/34391* (2013.01); *G05B 2219/49001* (2013.01); *G05B 2219/50083* (2013.01); *G05B 2219/50112* (2013.01)

(58) Field of Classification Search
CPC ........... G05B 2219/34391; G05B 2219/49001; G05B 2219/50083; G05B 2219/50112; B23Q 11/04; B23Q 15/00; B23Q 15/07; B23Q 15/013; B23Q 15/12
See application file for complete search history.

(56) References Cited

U.S. PATENT DOCUMENTS

| | | | |
|---|---|---|---|
| 5,777,450 A | 7/1998 | Kono et al. | |
| 6,734,581 B1 * | 5/2004 | Griffis | G05B 19/00 192/129 R |
| 6,874,980 B1 * | 4/2005 | Noelle | B23Q 5/10 408/6 |
| 7,359,174 B2 * | 4/2008 | Gass | B23D 59/001 361/143 |
| 8,019,460 B2 * | 9/2011 | Akaiwa | G05B 19/4097 318/563 |
| 8,030,878 B2 * | 10/2011 | Iwashita | G01R 31/42 318/779 |
| 8,531,149 B2 * | 9/2013 | Kataoka | G05B 19/406 318/569 |
| 8,793,988 B2 * | 8/2014 | Ebihara | B23Q 11/0025 60/404 |
| 9,248,539 B2 * | 2/2016 | Tajima | H02P 6/00 |
| 9,377,774 B2 * | 6/2016 | Tajima | G05B 19/406 |
| 9,401,669 B2 * | 7/2016 | Tsutsumi | H02P 29/025 |
| 2008/0218115 A1 * | 9/2008 | Hamabata | G05B 19/4063 318/565 |
| 2011/0241447 A1 * | 10/2011 | Ando | G05B 19/4063 307/326 |
| 2015/0137726 A1 * | 5/2015 | Tang | G05B 19/4061 318/563 |
| 2015/0212512 A1 * | 7/2015 | Butler | G05B 19/406 700/180 |
| 2016/0028331 A1 * | 1/2016 | Hashimoto | H02P 29/025 318/479 |

FOREIGN PATENT DOCUMENTS

| | | | | |
|---|---|---|---|---|
| CN | 103812391 A | | 5/2014 | |
| DE | 102008046830 A1 | * | 4/2009 | ......... G05B 19/4097 |
| DE | 102011014951 A1 | * | 9/2011 | ........... G05B 19/406 |
| DE | 102010053724 A1 | * | 6/2012 | .............. G05B 9/02 |
| EP | 0687395 B1 | * | 11/1998 | .............. G05B 9/03 |
| JP | 8-54914 A | | 2/1996 | |
| JP | H08-227307 A | | 9/1996 | |
| JP | 2007172068 A | * | 7/2007 | ............. G05B 19/19 |
| JP | 2013-41505 A | | 2/2013 | |

* cited by examiner

MOTOR CONTROL SYSTEM AND MOTOR CONTROL METHOD WHICH PROTECT TOOL AND WORKPIECE AT TIME OF POWER OUTAGE

RELATED APPLICATIONS

The present application claims priority to Japanese Application Number 2014-119915, filed Jun. 10, 2014, the disclosure of which is hereby incorporated by reference herein in its entirety.

BACKGROUND OF THE INVENTION

1. Field of the Invention

The present invention relates to a motor control system and a motor control method which protect a tool and workpiece at the time of a power outage during operation of a machine tool.

2. Description of the Related Art

A numerical control machine tool controls a tool rotation motor which drives rotation of a tool (hereinafter referred to as a "tool motor") and a workpiece motor which drives a workpiece by a numerical control device by numerical control (NC control) so as to machine a workpiece to a predetermined shape by the tool. Such numerical control machine tools include ones where the tool motor and workpiece motor have to be operated synchronously at all times. For example, a gear-forming machine which machines a workpiece to form a gear corresponds to this.

The motor control systems for synchronously controlling a tool motor and a workpiece motor include NC command synchronization systems and master-slave synchronization systems. An NC command synchronization system is a system in which two shafts are given movement commands for synchronous operation from the NC control device side and these commands are used for synchronous control. On the other hand, the master-slave synchronization system is a system in which a drive command is given from the NC control device side to one shaft (master shaft), position feedback information (pulses) of the master shaft is acquired, a drive command which is proportional to the position feedback information of the master shaft is given to the other shaft (slave shaft), and that command is used for synchronous control.

In the above-mentioned gear-forming machine, if a power outage occurs when the workpiece is being machined by a tool, the tool motor and the workpiece motor will decelerate and stop since the power to the amplifiers which drive them is cut. In this regard, the deceleration of the tool motor and the workpiece motor is deceleration which runs counter to the speed control from the numerical control device, so the operations of the tool motor and the workpiece motor until stopping become asynchronous. If, in this way, the synchronous operations of the tool motor and the workpiece motor become asynchronous operations due to a power outage, the workpiece and the tool are liable to be damaged.

Among general machine tools, there are ones wherein, at the time of a power outage, the drop in a direct current link (DC link) voltage of the alternating current/direct current converter of the machine tool is monitored while forcibly making the shaft of the machine tool decelerate, regenerated energy is used to maintain the DC link voltage, and a linear shaft for moving the tool or workpiece is made to retract. In this regard, in a gear-forming machine which employs the NC command synchronization system, if ignoring the NC command and forcibly making the shaft decelerate in accordance with the drop in the DC link voltage, synchronization with the shaft which operates coordinated with this will be lost, so this technique could not be applied at the time of a power outage.

Therefore, the applicant previously proposed a gear-forming machine which employs a master-slave synchronization system wherein when a power outage occurred during machining, the state of the drop in the DC link voltage was monitored while forcibly making the master shaft constituted by the tool shaft decelerate and making this and the slave shaft constituted by the workpiece shaft decelerate and stop while maintaining synchronization (see Japanese Patent Publication No. 8-227307A). Due to this technique, even if there is a power outage, the synchronization of the tool shaft and the workpiece shaft is substantially maintained. Note that, in the case of applying this art, the workpiece shaft may also be made the master shaft and the tool shaft may be made the slave shaft.

In this regard, even if using the motor control system which is disclosed in Japanese Patent Publication No. 8-227307A, if a power outage occurs right in the middle of cutting a gear and the master shaft is made to forcibly decelerate, the slave shaft cannot keep up with the forced deceleration of the master shaft, the synchronization error ends up becoming larger in an instant, and the workpiece is liable to end up being damaged. In particular, in the case of high precision gear forming, the damage to the workpiece has been an issue.

SUMMARY OF THE INVENTION

The present invention has as its object the provision of a motor control system and motor control method which can set a delay time to between a power outage to when forced deceleration of the master shaft is started and can prevent damage to the workpiece at the time of a power outage.

According to one embodiment of the present invention, there is provided a motor control system which makes a tool motor and a workpiece motor operate in synchronization by application of a master-slave synchronization system in a machine tool which is provided with a tool motor which makes a tool shaft rotate to make a tool operate, a workpiece motor which makes a workpiece shaft rotate to make a workpiece move, and a linear shaft motor which drives a linear shaft to change a distance between the two shafts of the tool shaft and the workpiece shaft, the motor control system comprising a power outage detector which detects a power outage of a power supply when the tool motor and the workpiece motor are synchronously rotating, a forced deceleration circuit which forcibly makes the master shaft as constituted by either of the tool motor and the workpiece motor decelerate at the time of detection of a power outage by the power outage detector, a retraction device which makes the linear shaft motor operate to make a distance between the two shafts increase to perform a retraction operation at the time of detection of a power outage by the power outage detector, and a delay circuit which delays a start of operation of the forced deceleration circuit by a predetermined time at the time of detection of a power outage by the power outage detector.

Further, according to another embodiment of the present invention, there is provided a motor control method at the time of a power outage which is used in a motor control system which makes a tool motor and a workpiece motor operate in synchronization by application of a master-slave synchronization system in a machine which is provided with a tool motor which makes a tool shaft rotate to make a tool rotate, a workpiece motor which makes a workpiece shaft rotate to make a workpiece rotate, and a linear shaft motor which drives a linear shaft to change a distance between the two shafts of the tool shaft and the workpiece shaft, the motor control method comprising detecting if a power outage has occurred when the tool motor and the workpiece motor are synchronously rotating, putting a hold on forced deceleration of the master shaft as constituted by either of the tool motor and the workpiece motor at the time of a power outage, making the linear shaft motor operate to make a distance between the two shafts increase as a retraction operation while putting a hold on forced deceleration of either of the tool motor and the workpiece motor, and releasing the hold on forced deceleration of either of the tool motor and the workpiece motor after the elapse of the predetermined time and making either of the tool motor and the workpiece motor perform forced deceleration.

According to the motor control system and motor control method of the present invention, right after a power outage, the linear shaft for driving the tool or workpiece is driven for making the tool and workpiece perform a retraction operation until they are separated by exactly a distance whereby they will not contact and forced deceleration of the tool shaft for maintaining the voltage of the DC link is delayed, so there is the advantageous effect that it becomes possible to prevent damage to the workpiece due to forced deceleration of the master shaft constituted by the tool shaft or workpiece shaft.

BRIEF DESCRIPTION OF THE DRAWINGS

The present invention will be understood more clearly by referring to the drawings attached below.

DETAILED DESCRIPTION

Figure 1:
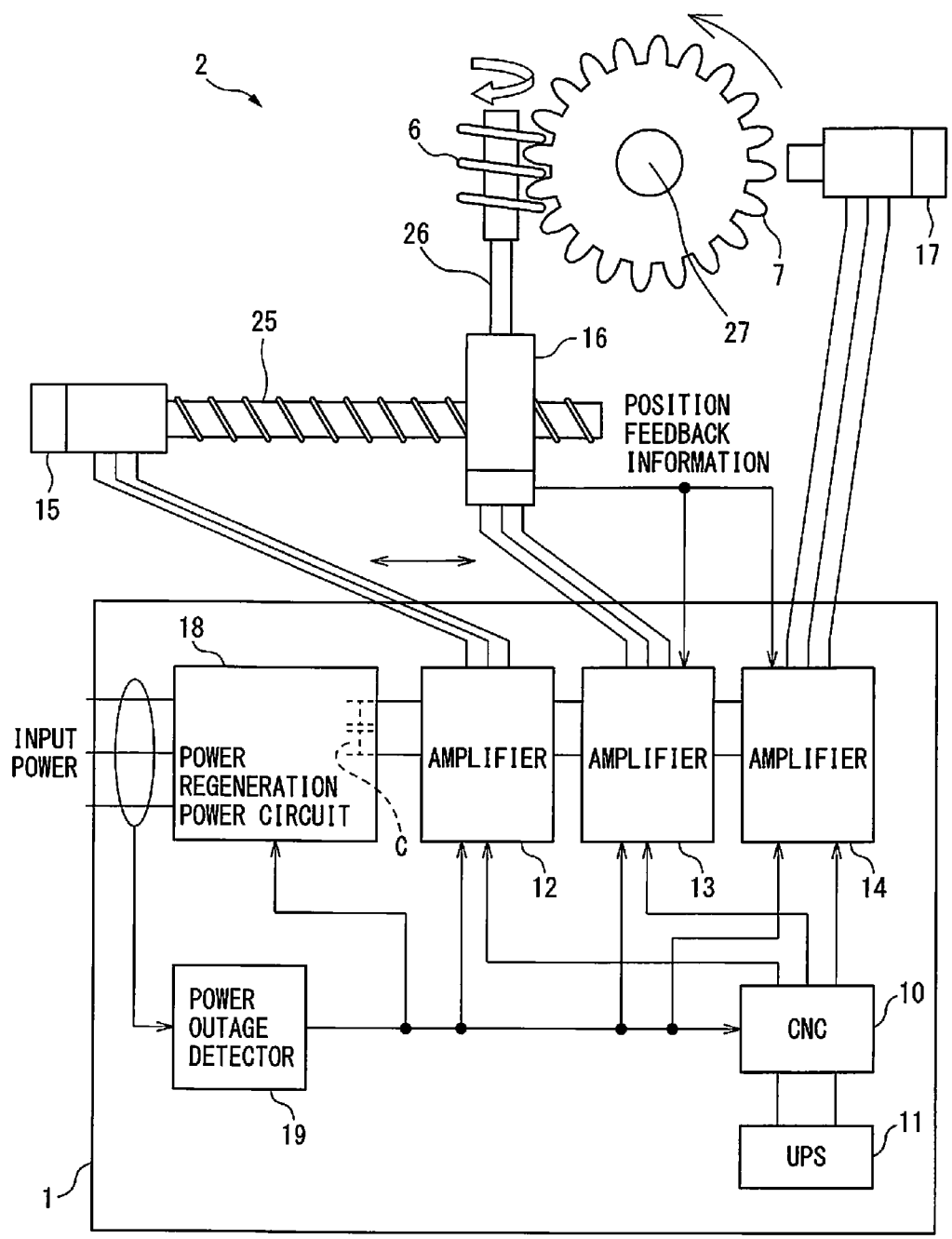
FIG. 1 is a block diagram which illustrates the structure of one embodiment of a motor control system of the present invention.

Below, referring to the drawings, an embodiment of the present invention will be explained in detail based on specific examples.

FIG. 1 illustrates the structure of one embodiment of a motor control system 1 which controls a tool motor 16, workpiece motor 17, and linear shaft motor (in the present embodiment, tool shaft movement motor) 15 of a machine tool which machines a workpiece 7 by a tool 6, for example, a gear-forming machine 2, to which a master-slave synchronization system is applied. The motor control system 1 includes a numerical control device (in the figure, described as "CNC") 10 which numerically controls the motors. This numerical control device 10 is made able to continue a control operation even when a power outage occurs by using an uninterruptible power supply (described in figure as "UPS") 11 to back up the power. The control output signals of the numerical control device 10 are input to the amplifiers 12, 13, and 14, while the outputs of these amplifiers 12, 13, and 14 are respectively input to the tool shaft movement motor 15, tool motor 16, and workpiece motor 17.

A power regeneration power circuit 18 is connected at its alternating current side terminal with, for example, a three-phase alternating current commercial power supply and is connected at its direct current side terminal with a DC link part which is comprised of a capacitor C. The DC link part is connected in parallel with the amplifiers 12, 13, and 14. Furthermore, the motor control system 1 is provided with a power outage detector 19. The input terminal of the power outage detector 19 is connected to an input power supply, while the output terminal of the power outage detector 19 is connected to the power regeneration power circuit 18, amplifiers 12, 13, and 14, and numerical control device 10. Note that, the power outage detector 19 may also be built into the power regeneration power circuit 18.

Further, the motor control system 1 uses the master-slave synchronization system for synchronous control of a tool shaft 26 of the tool motor 16 and a workpiece shaft 27 of the workpiece motor 17. In the present embodiment, the tool shaft 26 is made the master shaft while the workpiece shaft 27 is made the slave shaft, so the position feedback information which is generated as a result of driving the tool motor 16 is input to the amplifiers 13 and 14. Note that, the master shaft and the slave shaft may be either of the tool shaft 26 and the workpiece shaft 27. Synchronous control of two shafts using position feedback information is known, so here the explanation will be omitted.

When there is no power outage and the gear-forming machine 2 is normally performing a machining operation, the numerical control device 10 controls the tool motor 16 and workpiece motor 17 to operate synchronously at all times. Further, it controls the tool shaft movement motor 15 so as to make the tool approach the workpiece when starting machining and move away from the workpiece when ending machining. At the time of normal control, these tool shaft movement motor 15, tool motor 16, and workpiece motor 17 are controlled to be driven by the supply of power from the power regeneration power circuit 18 through the amplifiers 12, 13, and 14. On the other hand, at the time of deceleration control, the regenerated energy which is produced due to deceleration at the tool motor 16 and workpiece motor 17 is fed back to the input power supply through the amplifiers 12, 13, and 14 and power regeneration power circuit 18.

If a power outage occurs during the machining operation of the gear-forming machine 2, the power outage detector 19 detects the power outage and outputs a power outage signal. The power outage signal is input to the numerical control device 10, the power regeneration power circuit 18, and the amplifiers 12, 13, and 14. When the power regeneration power circuit 18 receives the power outage signal, it stops the power regeneration operation, that is, the inverter function, and prevents the regenerated energy from returning from the DC link part to the input power supply.

Figure 2:
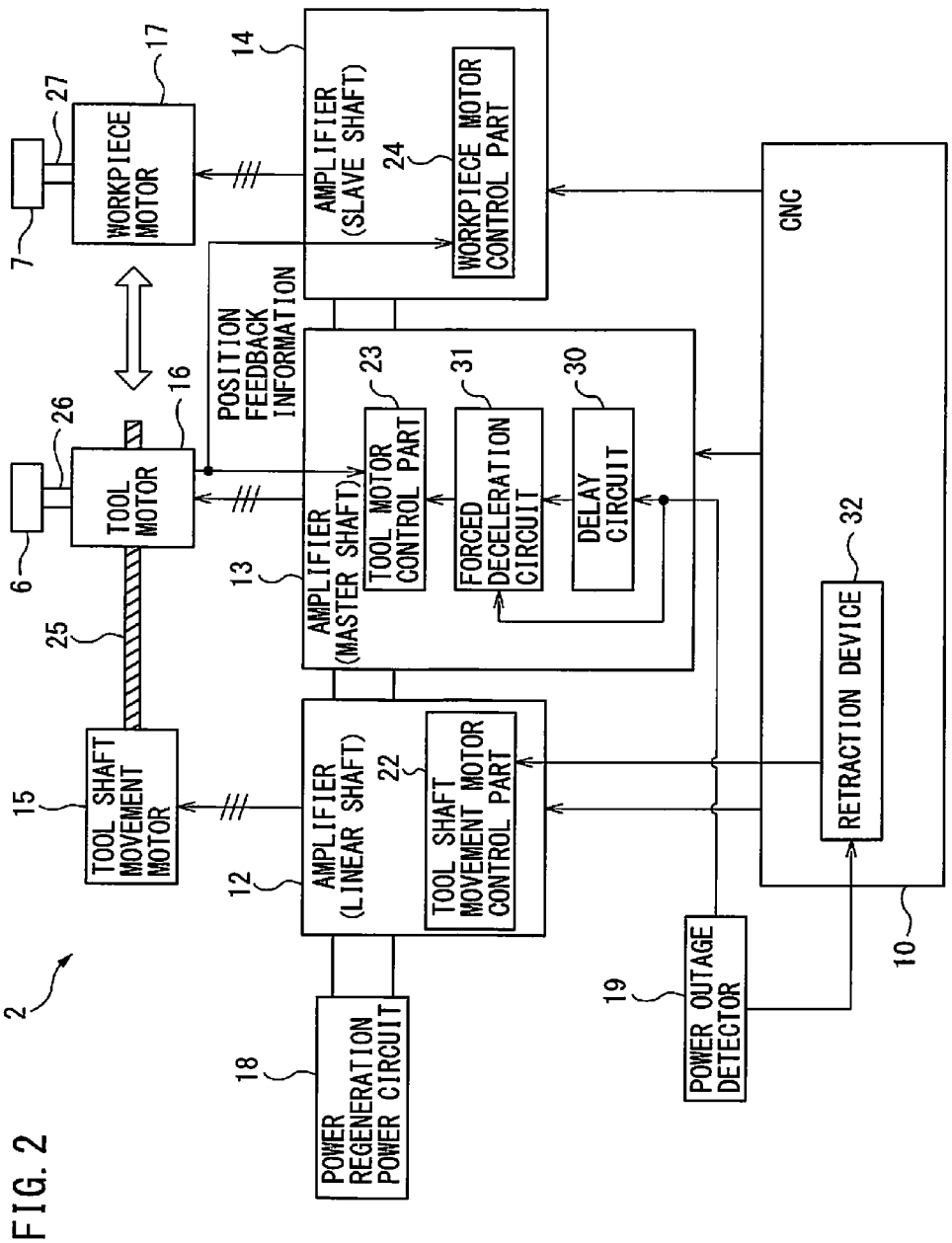
FIG. 2 is a block circuit diagram which illustrates the configuration of a control function which is provided at a numerical control device of FIG. 1.

FIG. 2 illustrates by blocks the functions of the numerical control device 10 and the functions of the amplifiers 12 to 14 in the present invention and corresponds to FIG. 1. FIG. 2 illustrates by blocks the gear-forming machine 2 which was explained in FIG. 1. The amplifier 12 has a built-in tool shaft movement motor control part 22, the amplifier 13 has a built-in tool motor control part 23, and the amplifier 14 has a built-in workpiece motor control part 24. The tool shaft movement motor 15, tool motor 16, and workpiece motor 17 are controlled through the amplifiers 12 to 14 by a three-phase alternating current, while the amplifiers 12 to 14 are supplied with power from the DC link of the power regeneration power circuit 18.

Further, in the master-slave synchronization system, the position feedback information which is output from the tool motor 16 which drives the master shaft (tool shaft 26) is input to the tool motor control part 23 in the amplifier 13 and the workpiece motor control part 24 in the amplifier 14. The position feedback information is used for control so that the workpiece shaft 27 operates synchronously while tracking movement of the tool shaft 26.

In the present embodiment, the delay circuit 30 and the forced deceleration circuit 31 are provided at the amplifier 14 which drives the master shaft, while the retraction device 32 is provided at the numerical control device 10. The forced deceleration circuit 31 outputs a forced deceleration command to the tool motor control part 23 and makes the tool motor 16 decelerate through the amplifier 13 at the time of detection of a power outage by the power outage detector 19. At this time, the workpiece motor 17 refers to the position feedback information from the tool motor 16 and performs a deceleration operation while tracking the deceleration operation of the tool motor 16. Further, the retraction device 32 instructs operation of the tool shaft movement motor control part 22 at the time of detection of a power outage by the power outage detector 19. The tool shaft movement motor control part 22 makes the tool shaft movement motor 15 operate through the amplifier 12, makes the intershaft distance between the tool shaft 26 and the workpiece shaft 27 increase, and separates the tool 6 and the workpiece 7 as a retraction operation.

The above operations are operations of the amplifiers 12, 13, and 14 and numerical control device 10 in the case of no delay circuit 30. On the other hand, the present embodiment is provided with a delay circuit 30 for causing the start of operation of the forced deceleration circuit 31 to be delayed by a predetermined time, so at the time of detection of a power outage by the power outage detector 19, the forced deceleration circuit 31 cannot immediately operate. That is, at the time of detection of a power outage by the power outage detector 19, the forced deceleration circuit 31 tries to output a forced deceleration command to the tool motor control part 23, but at this time, the forced deceleration circuit 31 receives an operation hold signal from the delay circuit 30, so the forced deceleration circuit 31 cannot output a forced deceleration command to the tool motor control part 23.

On the other hand, the retraction device 32 does not receive an operation hold signal from the delay circuit 30, so immediately at the time of detection of a power outage by the power outage detector 19, operation of the tool shaft movement motor control part 22 is commanded. As a result, at the time of a power outage, the retraction device 32 operates in advance of the operation of the forced deceleration circuit 31, the tool shaft movement motor 15 operates whereby the intershaft distance between the tool shaft 26 and the workpiece shaft 27 increases, and the tool 6 and the workpiece 7 are separated until the state where they do not contact. Further, after a predetermined time from when the tool shaft movement motor 15 separates the tool 6 and workpiece 7 to a state where they do not contact each other, the delay circuit 30 lifts the operation hold signal which had been input to the forced deceleration circuit 31.

Due to the lifting of the operation hold signal, the forced deceleration circuit 31 outputs a forced deceleration command to the tool motor control part 23 and causes the tool motor 16 to forcibly decelerate through the amplifier 13. At this time, the workpiece motor 17 performs a deceleration operation while tracking the deceleration operation of the tool motor 16. At this time, even if the workpiece motor 17 cannot keep up with the deceleration operation of the tool motor 16 and the synchronization error ends up becoming large, the tool 6 and the workpiece 7 are separated up to a state where they do not contact, so the workpiece is not liable to be damaged.

Figure 3:
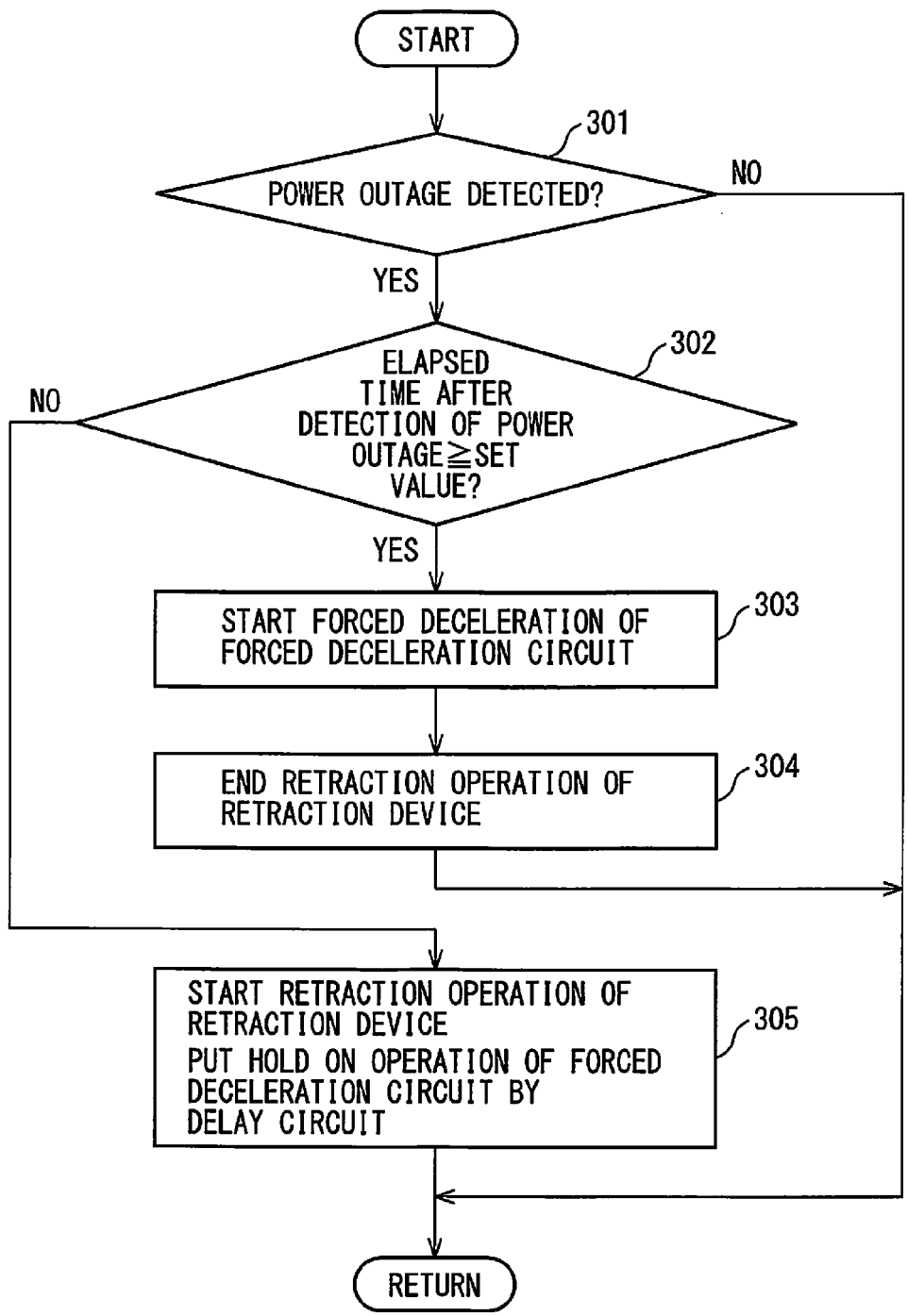
FIG. 3 is a flow chart which illustrates the control routine of a motor control system of the present invention.

FIG. 3 is a flow chart which illustrates a control routine of the motor control system 1. The routine is repeated every predetermined time when the tool motor 16 and the workpiece motor 17 operate synchronously due to the numerical control device 10. At step 301, the presence of a power outage is detected by the power outage detector. When the power outage detector does not detect a power outage (NO), this routine is ended. Further, when at step 301 the power outage detector detects a power outage (YES), the routine proceeds to step 302.

At step 302, it is judged if the elapsed time after detection of the power outage by the power outage detector has become a set value or more. Further, when the elapsed time after the detection of the power outage by the power outage detector is less than the set value (NO), including when the routine first proceeds to step 302, the routine proceeds to step 305 where the retraction device starts the retraction operation and where the delay circuit puts a hold on the start of operation of the forced deceleration circuit, then this routine is ended. The "retraction device" which is described at step 305, as explained in FIG. 2, makes the tool shaft movement motor 15 operate to drive the linear shaft 25 to separate the tool 6 and the workpiece 7 as a retraction operation and is provided at the numerical control device 10.

When the processing of step 302 and step 305 is repeated several times, then it is judged at step 302 that the elapsed time after the detection of a power outage by the power outage detector has become a set value or more (YES), the routine proceeds to step 303 where the hold on the start of operation of the forced deceleration circuit by the delay circuit is lifted and the forced deceleration operation of the forced deceleration circuit is started. At the next step 304, the retraction operation of the retraction device is made to end to end this routine. In the forced deceleration operation, as explained in FIG. 2, the forced deceleration circuit 31 makes the amplifier 13 of the tool motor 16 perform forced deceleration. In a manner tracking this, the workpiece motor 17 performs a deceleration operation. The two decelerate and stop which maintaining synchronization.

At this time, the regenerated energy which is obtained by deceleration control of the tool motor 16 and the workpiece motor 17 is returned through the amplifiers 13 and 14 which function as converters to the DC link part and is utilized as retraction energy of the tool shaft movement motor 15 through the amplifier 12.

Figure 4:
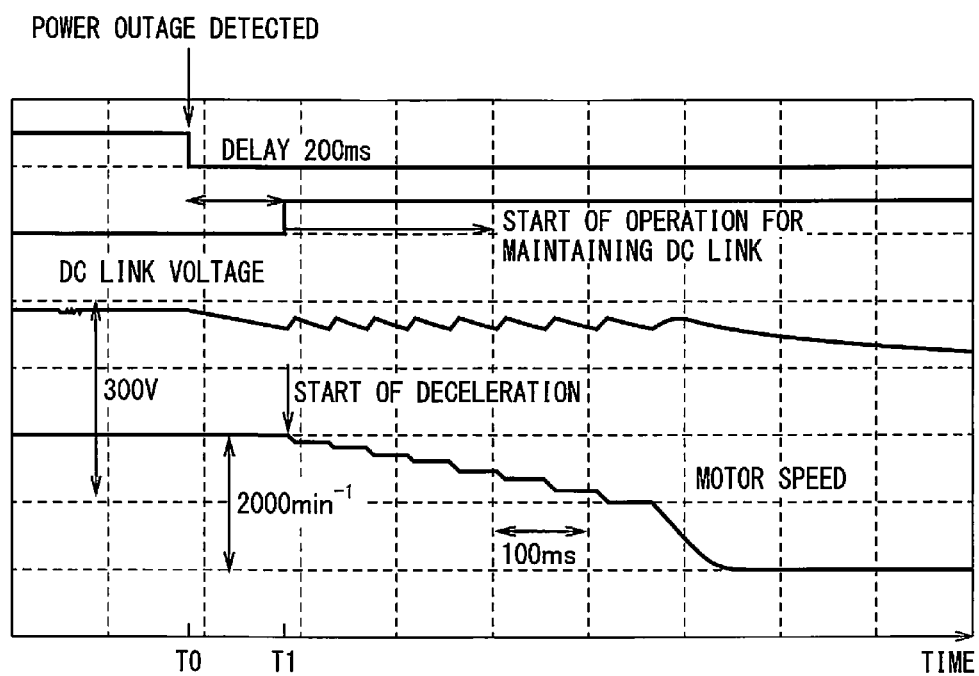
FIG. 4 is a time chart which illustrates an operation of a motor control system of the present invention.

FIG. 4 is a time chart which illustrates the operation of the numerical control device 10 in the motor control system 1 which is explained in FIG. 3. Using the abscissa as the time, if assuming that, at the time T0, a power outage is detected, at the time T0, the control for deceleration of the tool motor is put on hold and the tool shaft movement motor operates to separate the tool shaft from the workpiece shaft. If making the tool shaft movement motor operate for a predetermined time (for example 200 ms), the tool and the workpiece will no longer contact each other. If this time is designated as T1, at the time T1, deceleration control of the tool motor is started. If the master shaft as constituted by the tool shaft 26 starts to decelerate, tracking this, the slave shaft as constituted by the workpiece shaft 27 also starts to decelerate. The delay time from the time T0 to the time T1 (setting of step 302) is 200 ms in the present embodiment, but this delay time is not limited so long as the time necessary for reaching the state where the tool and the workpiece do not contact.

If passing the time T1, the deceleration control of the tool motor and the workpiece motor is started and the motor speed falls. Further, the regenerated energy which is obtained by deceleration control of the tool motor and the workpiece motor is returned to the DC link part, so the DC link maintenance operation is also started.

Due to the above control by the numerical control device 10 which is illustrated by FIG. 1 and FIG. 2, in the present invention, for example, when a power outage occurs in the gear-forming machine 2, before control is started for deceleration of the tool motor 16 and workpiece motor 17, the tool shaft movement motor 15 is made to operate to cause the engaged tool 6 and workpiece 7 to separate until a state where they do not contact. Further, if separating to a state where the tool 6 and the workpiece 7 do not contact, deceleration control of the tool motor 16 and the workpiece motor 17 is started. As a result, it is possible to prevent damage to the tool 6 and workpiece 7 due to deceleration control of the tool motor 16 and workpiece motor 17.

Note that, in the above explained embodiments, the linear shaft 25 which adjusts the distance between the tool shaft 26 which makes the tool 6 operate and the workpiece shaft 27 which makes the workpiece 7 operate is used to separate the tool shaft 26 from the workpiece shaft 27 at the time of a power outage, but the linear shaft 25 may also be structured to separate the workpiece shaft 27 from the tool shaft 26 at the time of a power outage.

According to the present invention, when, like in a gear-forming machine, the tool which is driven by the tool shaft (master shaft) and the workpiece which is driven by the workpiece shaft (slave shaft) operate synchronously while engaged, even if a power outage occurs, the tool motor and the workpiece motor will never be forcibly decelerated while the two shafts remain in contact. As a result, even if a power outage occurs when the workpiece is being machined by the tool, the workpieces which are in contact with the tool are not liable to end up being damaged.

Above, the present invention was explained with reference to preferred embodiments, but a person skilled in the art would understand that various modifications and changes can be made without departing from the scope of the later explained claims.

What is claimed is:

1. A motor control system configured to cause a tool motor and a workpiece motor to rotate in synchronization by application of a master-slave synchronization system in a machine tool,
the machine tool including:
the tool motor configured to rotate a tool shaft to cause a tool to move,
the workpiece motor configured to rotate a workpiece shaft to cause a workpiece to move, and
a linear shaft motor configured to drive a linear shaft to change a distance between said tool shaft and said workpiece shaft, wherein
one of the tool shaft and the workpiece shaft is a master shaft and the other is a slave shaft, and
the motor control system is configured to cause the slave shaft to rotate in synchronization with the master shaft based on position feedback information of said master shaft,
said motor control system comprising:
a power outage detector configured to detect a power outage of a power supply when said master shaft and said slave shaft are synchronously rotating;
a forced deceleration circuit configured to perform a forced deceleration operation to forcibly cause either of said master shaft and said slave shaft to decelerate in response to a power outage signal output by said power outage detector;
a retraction device configured to cause said linear shaft motor to operate to increase the distance between said master shaft and said slave shaft to perform a retraction operation of separating said tool from said workpiece in response to the power outage signal output by said power outage detector; and
a delay circuit configured to
output an operation hold signal to the forced deceleration circuit in response to the power outage signal output by the power outage detector, and
lift the operation hold signal after a predetermined time from an input of the power outage signal to the forced deceleration circuit,
wherein
said motor control system is configured to perform the retraction operation by said retraction device in response to the power outage signal output by the power outage detector,
said forced deceleration circuit is configured to start the forced deceleration operation after the lifting of the operation hold signal, and
in the forced deceleration operation,
the workpiece motor is configured to perform deceleration tracking the forced deceleration of the tool motor so that the tool motor and the workpiece motor decelerate and stop while maintaining synchronization.

2. The motor control system according to claim 1, wherein said predetermined time period is a time period
from the time of said detection of the power outage by said power outage detector,
until a time when the distance between said master shaft and said slave shaft is increased by the retraction operation to reach a state where said tool and said workpiece no longer contact each other.

3. The motor control system according to claim 1, wherein after the elapse of said predetermined time period, said retraction device is configured to end the retraction operation.

4. The motor control system according to claim 1, wherein when said tool shaft is said master shaft and said workpiece shaft is said slave shaft, said linear shaft is configured to move said tool shaft away from said workpiece shaft to increase the distance between said master shaft and said slave shaft in said retraction operation.

5. The motor control system according to claim 1, wherein when said workpiece shaft is determined as said master shaft and said tool shaft is determined as said slave shaft, said linear shaft makes said workpiece shaft move from said tool shaft to thereby make the distance between said master shaft and said slave shaft increase.

6. The motor control system according to claim 1, wherein said machine tool is a gear-forming machine.

7. The motor control system according to claim 1, wherein the delay circuit and the forced deceleration circuit are provided at an amplifier configured to drive the master shaft.

8. The motor control system according to claim 1, wherein the motor control system is configured to
refer to the position feedback information from the tool motor, and
cause deceleration of the workpiece motor while tracking deceleration of the tool motor.

9. The motor control system according to claim 1, wherein, in the forced deceleration operation, the forced deceleration circuit is configured to cause an amplifier of the tool motor to perform the forced deceleration of the tool motor.

10. A motor control method performed in a motor control system, the motor control system configured to cause a tool motor and a workpiece motor to rotate in synchronization by application of a master-slave synchronization system in a machine tool, the machine tool including:
- the tool motor configured to rotate a tool shaft to cause a tool to rotate,
- the workpiece motor configured to rotate a workpiece shaft to cause a workpiece to rotate, and
- a linear shaft motor configured to drive a linear shaft to change a distance between-said tool shaft and said workpiece shaft, wherein
- one of the tool shaft and the workpiece shaft is a master shaft and the other is a slave shaft, said motor control method comprising:
- rotating said slave shaft in synchronization with said master shaft based on position feedback information of said master shaft;
- detecting whether a power outage has occurred when said master shaft and said slave shaft are synchronously rotating;
- putting a hold on forced deceleration of either of said master shaft and said slave shaft at a time when the power outage is detected,
- causing said linear shaft motor to operate to increase the distance between said master shaft and said slave shaft in a retraction operation of separating said tool from said workpiece, during said putting the hold on the forced deceleration of either of said master shaft and said slave shaft when the power outage is detected;
- lifting the hold on the forced deceleration of either of said master shaft and said slave shaft after the elapse of a predetermined time period from the time of the detection of the power outage, and performing the forced deceleration of either of said master shaft and said slave shaft; and
- in the forced deceleration, causing the workpiece motor to perform deceleration tracking the forced deceleration of the tool motor, so that the tool motor and the workpiece motor decelerate and stop while maintaining synchronization.

\* \* \* \* \*